United States Patent [19]
Giovannetti

[11] Patent Number: 5,346,349
[45] Date of Patent: Sep. 13, 1994

[54] FASTENING DEVICE, FOR EXAMPLE FOR FURNITURE COMPONENTS AND THE LIKE

[76] Inventor: Antonio Giovannetti, Via Fratelli Cervi - Residenza Fontana, Milano 2 - Segrate (Milano), Italy

[21] Appl. No.: 15,536

[22] Filed: Feb. 9, 1993

[30] Foreign Application Priority Data

Mar. 23, 1992 [IT] Italy .................. MI92 A 000678

[51] Int. Cl.⁵ .................. F16B 21/00; B25G 3/00; B25G 3/20
[52] U.S. Cl. .................. 411/549; 411/349; 403/350; 403/367
[58] Field of Search .................. 411/21, 264, 293, 349, 411/549, 551, 552, 553, 354; 403/350, 352, 359, 367; 292/58, 59

[56] References Cited

U.S. PATENT DOCUMENTS

| | | | |
|---|---|---|---|
| 2,403,247 | 7/1946 | Sullivan | 411/551 |
| 3,956,803 | 5/1976 | Leitner | 411/349 |
| 4,069,549 | 1/1978 | Zernig et al. | |
| 4,789,287 | 12/1988 | Le | 411/551 X |
| 5,062,752 | 11/1991 | Takaguchi | 411/552 X |

FOREIGN PATENT DOCUMENTS

| | | |
|---|---|---|
| 1936360 | 3/1970 | Fed. Rep. of Germany . |
| 2522393 | 12/1976 | Fed. Rep. of Germany . |
| 4018280 | 1/1991 | Fed. Rep. of Germany . |
| 92009115 | 4/1992 | Fed. Rep. of Germany . |
| 2328875 | 5/1977 | France . |
| 2374494 | 7/1978 | France . |
| 1526350 | 9/1978 | United Kingdom . |

*Primary Examiner*—Neill R. Wilson
*Attorney, Agent, or Firm*—Young & Thompson

[57] ABSTRACT

A fastening device comprises a hollow box-shaped container-guide (12) inside which a shaft-like fastening member is rotatably received. The fastening member is provided with at least one projecting, eccentric tongue (24), which is inclined with respect to the axis (a) of the shaft, or is preferably shaped according to a section of a helicoid. The fastening member is rotatable between a position in which the locking tongue (24) is contained inside the hollow container (12) and a position in which it projects from it to grip into the walls of a hole which receives the container, or against the wall of a panel. A head (22) of the fastening member (14) can be maneuvered from the outside and has two abutments which collaborate with abutments integral with a head (18) of the container in order to define the completely retracted position of the tongue or tongues and the completely extracted position of the same. The container can be realized in various forms.

8 Claims, 4 Drawing Sheets

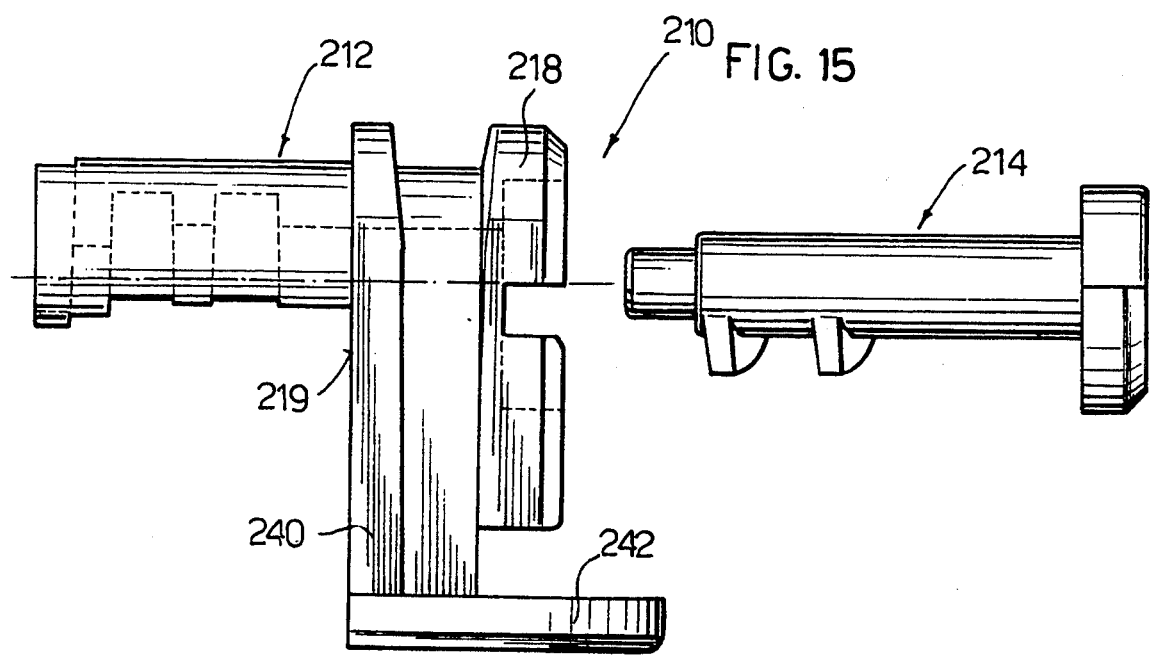
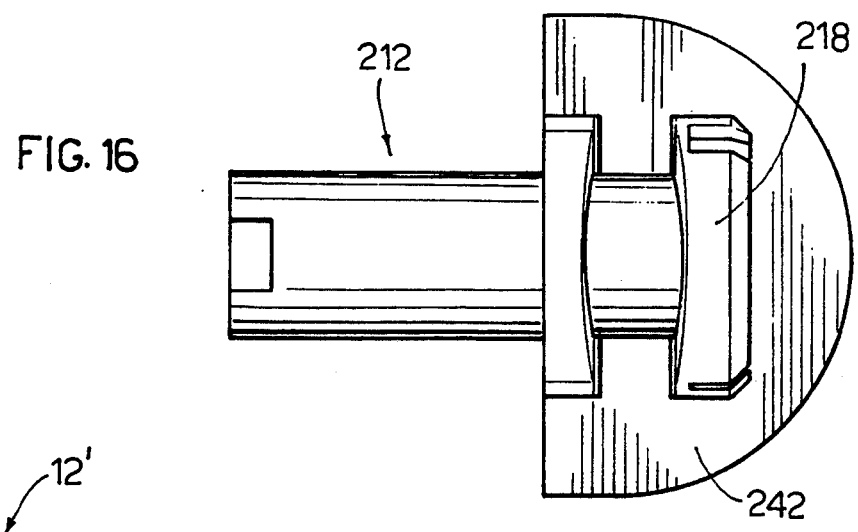
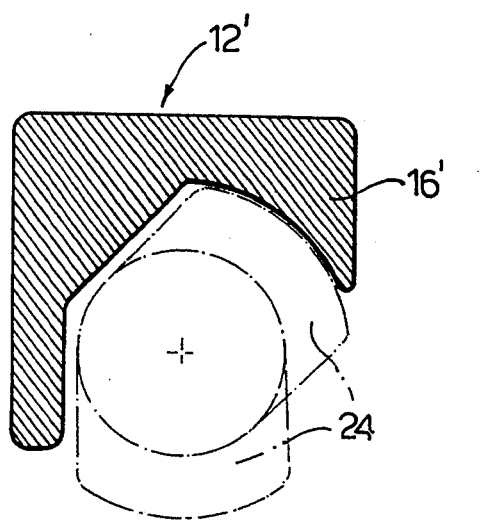

5,346,349

FASTENING DEVICE, FOR EXAMPLE FOR FURNITURE COMPONENTS AND THE LIKE

FIELD OF THE INVENTION

The present invention concerns the field of devices for the assembly of components of pieces of furniture or furnishing in general.

BACKGROUND OF THE INVENTION

Many very different types of such devices are in existence. For example, in the Italian Patent 1070935 (BLUM) a description is given of hooks, which can be rotated between a retracted position and an extended position into the lateral wall of holes, for fastening a hinge.

The Italian Patent 1060626 (Heinze) describes locking elements which comprise a shaft, suitable for being rotated around its own axis, with one projecting part, suitable for gripping the walls of a hole, for fixing; the projecting part is flat, at right angles to the shaft, and is disc-shaped, elliptical or in the shape of a flat spiral. Such a locking element cannot be used when inserted into a hole which is coaxial with the element, but can only function if it is positioned with its axis oblique with respect to the wall of the hole, or if it is inserted out-of-alignment in a hole which has a much bigger diameter. In addition, it does not allow gradual gripping, and all of this causes its application to be considerably limited.

OBJECTS OF THE INVENTION

An object of the present invention is to realize a fastening device which is practical, easy to use, safe, and which is able to be used inside holes which have a limited diameter, and in which the gripping force can be gradual.

A further object is to realize such a device which can be used both for fastening to a wooden panel and for fastening to a metallic panel, at least with a determined thickness of the latter.

These objects have been achieved with the fastening device recited in claim 1. Further characteristics are listed in the subsequent claims.

SUMMARY OF THE INVENTION

The new device comprises a box type container or casing element with a cylindrical body open along a portion parallel to the axis; such element contains a shaft-like locking member located in it and rotatable around its own axis, and arranged longitudinally to the body of the casing. The shaft of the locking member has one or two projecting tongues positioned at an inclination angle with respect to the axis of the shaft, or preferably positioned along a section of helical surface around the axis of the shaft.

The locking member is provided with a cross head or at any rate one which can be maneuvered, for example, by means of a screw-driver, and which is able to rotate between an insertion or resting position, in which the tongues are enclosed within the body of the container, and a locking or working position, in which the tongues project from the body.

According to a preferred embodiment, the head of the locking member and the body of the container element have abutment means for defining the insertion position and the locking position.

The new device eliminates the drawbacks connected with the previous technique. It can be used inside holes which have a limited diameter, it permits gradual gripping and it is easy to use and reliable; it is simple to assemble since it consists of only two parts. It is able to be used both with wooden panels and metallic panels, as long as the latter are of a thickness which is comprised within a certain range.

BRIEF DESCRIPTION OF THE DRAWINGS

An exemplary embodiment of the present invention will now be described with reference to the appended drawings, in which:

FIGS. 12, 13 and 14 show modified embodiments of the container-guide element, in transverse section;

FIG. 15 is a side view taken along a second embodiment, designed as a support for shelves;

FIG. 16 is a top plan view of the container element in FIG. 15;

DETAILED DESCRIPTION OF THE INVENTION

Figure 1:
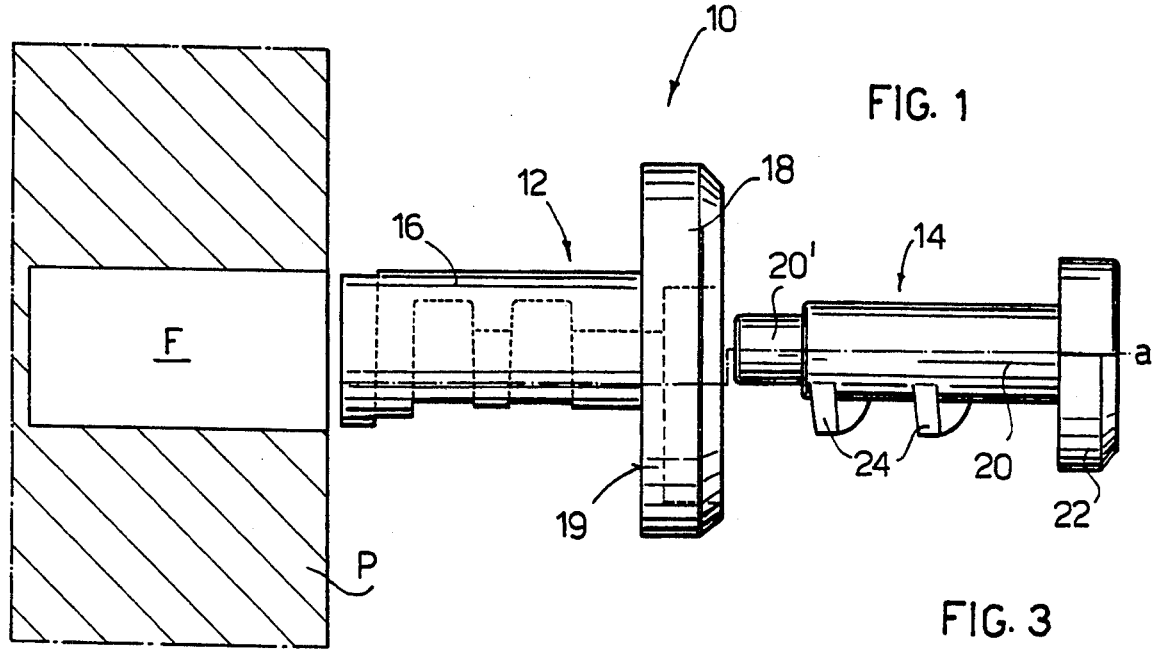
FIG. 1 is an exploded side view of a device in one of its embodiments, on an enlarged scale.
Figure 3:
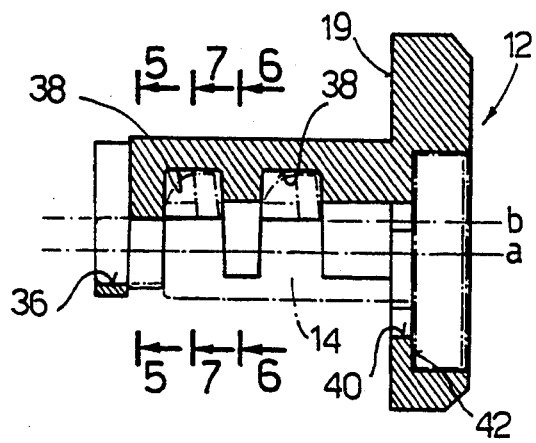
FIG. 3 is a longitudinal axial section taken alone the container element; the locking member is shown by a dash-dot line in the retracted position.
Figure 2:
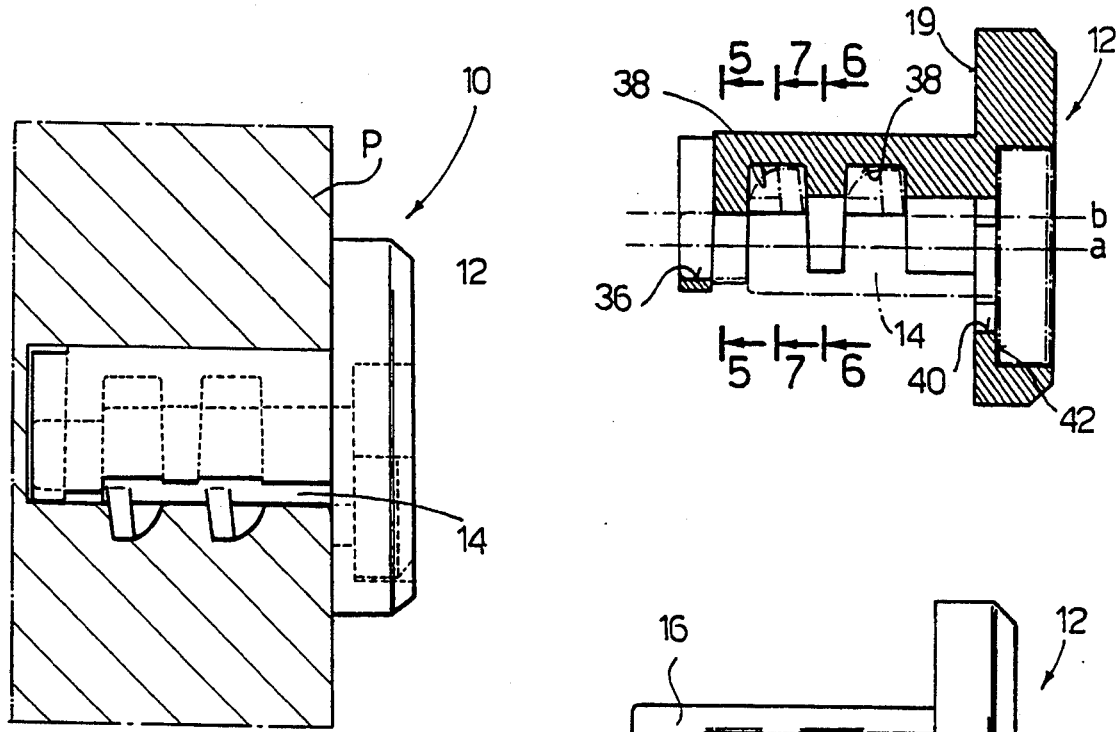
FIG. 2 is a side view of the device, assembled and in the extended locking position.
Figure 4:
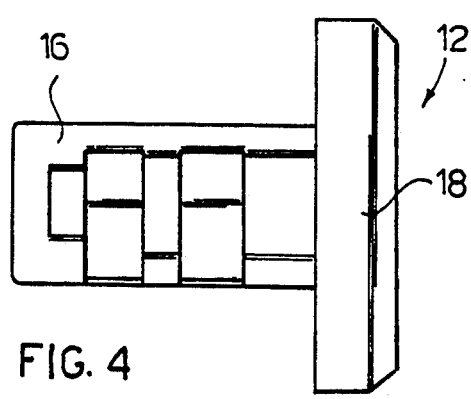
FIG. 4 is top plan view.
Figure 5:
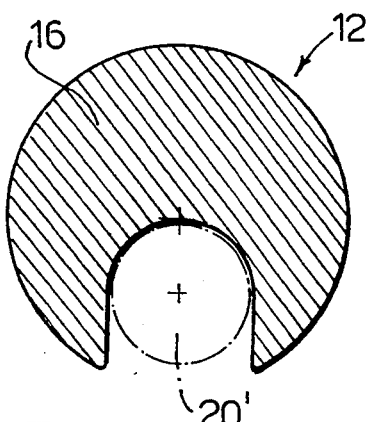
FIG. 5 is a section taken along 5—5 in FIG. 2, enlarged with respect to the previous figures; the locking member is drawn with dash-dot lines.
Figure 6:
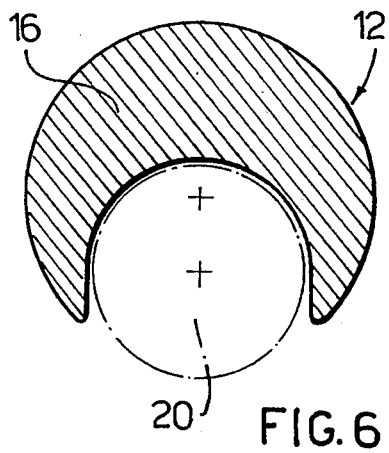
FIG. 6 is a section taken along 6—6 on the scale used in FIG. 5; the locking member is drawn with dash-dot lines.

In the figures, a fastening device 10 is drawn, for the sake of example. In this text, the words "high", "low", "upper", "lower" and the like should be understood with reference to the positions illustrated in the figures, and not in any restrictive sense. The device 10 substantially comprises a container-guide element 12 and a locking member 14. The container 12 is formed with a hollow body 16 and a head 18. In FIGS. 1 and 2, a panel P is also illustrated with a hole F, whose depth is sufficient to receive the body, and which has a diameter substantially equal to that of the body or somewhat bigger.

Figure 10:
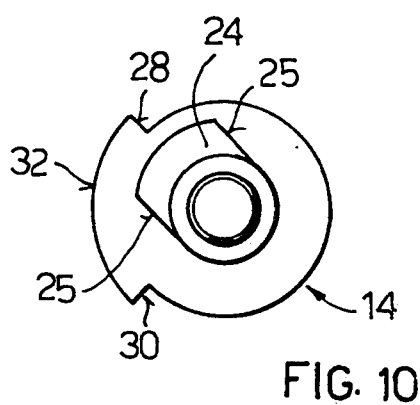
FIG. 10 is a view of the locking member from the other end.
Figure 11:
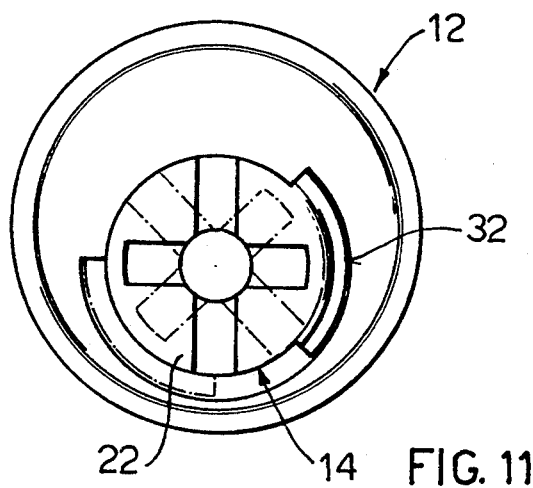
FIG. 11 is a view similar to the one in FIG. 8, but with the locking member inserted.

The locking element 14 comprises a shaft 20 to which a head 22 is integral. The shaft 20 has a substantially cylindrical shape, with an axis a, preferably with a coaxial end wall 20' with a small diameter. From the side wall of the shaft at least one eccentric tongue 24 projects. The tongue 24 can be extended along a plane which is oblique with respect to the axis a of a shaft, but preferably it is extended for an arc along a helical surface which surrounds the axis a, and it is preferably confined laterally (FIG. 10) by parallel surface 25. The shape of the locking tongue, in a transverse section taken at the median helicoid of the tongue, is preferably tapered towards the outside.

The head 22 of the locking member has a notch, or preferably two cross notches 26, so that it is able to be maneuvered with a screw-driver; on its outer cylindrical surface it has two radial abutment surfaces or stops 28, 30, which are positioned at 90° to each other on the sides of a projecting part 32 in the exemplary embodiment.

Figure 7:
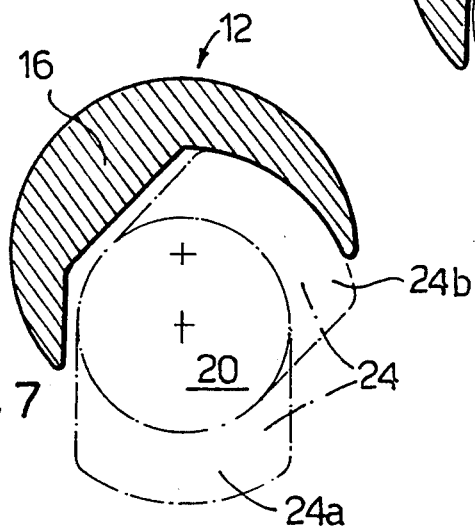
FIG. 7 is a section taken along 7—7 on the scale used in FIG. 5; the locking member is drawn in the two positions, retracted and extended.
Figure 8:
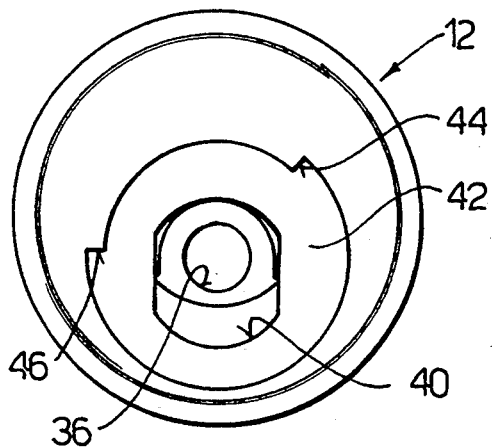
FIG. 8 is a view taken from one end of the container element.
Figure 9:
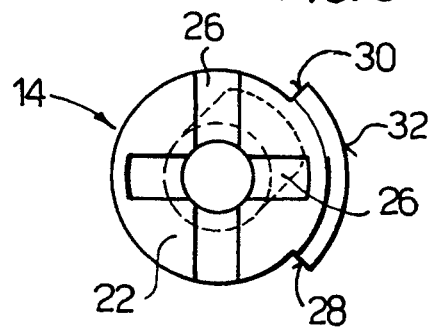
FIG. 9 is a view of the locking member taken from the head end.
Figure 13:
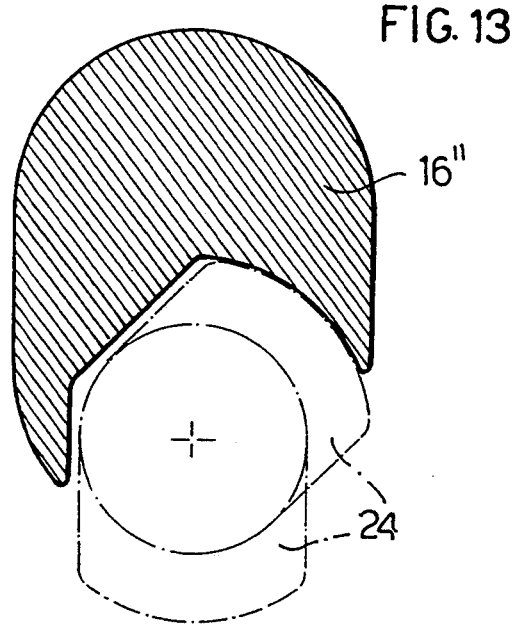
Figure 14:
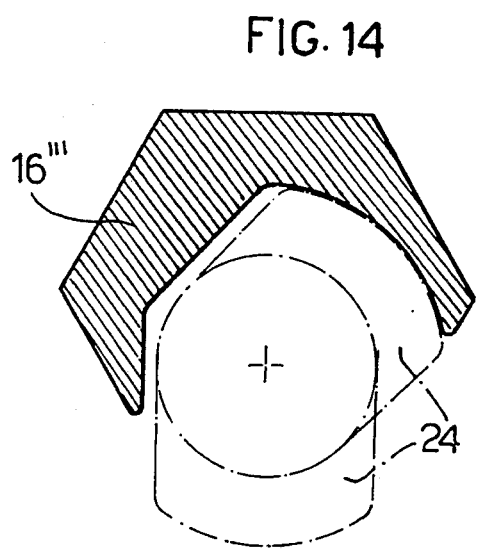
Figure 18:
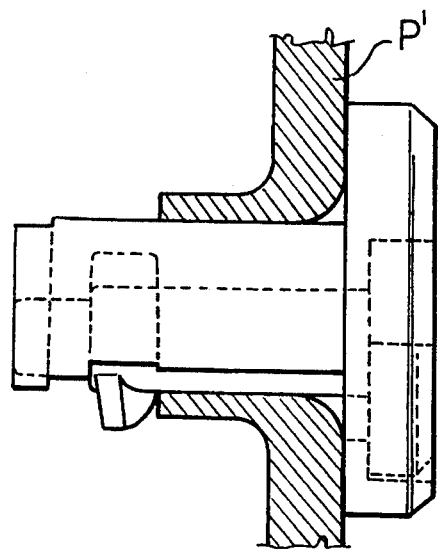
FIG. 18 is a side view of the device in FIG. 17 locked onto a metallic panel.

The container-guide or casing element 12 has the elongated hollow body 16, generally but not necessarily provided with an outer cylindrical form with an axis b, and machined inside in such a way that it has an end seating 36 and one or more intermediate housings 38. In the FIGS. 12, 13 and 14 other possible section shapes for the body are shown, that is, a substantially square section 16' (FIG. 12), an elongated section 16" (FIG. 18) and a polygonal section 16''' (FIG. 14). The head 18 has a wall 19 which is at right angles to b, a through hole 40 and a head seating 42. The end seating 36 is cylindrical with axis a and diameter related with the diameter of the end 20' of the shaft. The intermediate housings are of a shape and dimensions, transversely to the axis, which are sufficient for receiving the tongues 24 of the shaft. The cylindrical body 16 is open along the whole of a portion lying along a generatrix. In conclusion, the through hole 40 in the head of the container is of an elongated shape; the part of the wall which is higher with respect to the axis a has its radius at least equal to the radius of the shaft 14; the lower part is separated from a by a radius equal to the radius of the tongues. The hole 40, therefore, allows the passage of the shaft, with the tongues arranged in a determined position; in the example, in the lowered position, which is illustrated in the FIGS. 1 and 7 (in the latter it is the position 24a).

The head of the container-guide has abutment surfaces respectively indicated with 44 and 46, which are radial with respect to the axis b and offset at about 180°. Preferably the surfaces 44 and 46 are made on the walls of the seating 42 and this has dimensions which are suitable for receiving the head 22 of the locking member.

An explanation is given below of the operation of the device.

In the assembly phase, the locking member 14 is inserted into the container-guide element 12, through the opening 40 until the end 20 comes into position in the opening 36; in the inserting phase, the locking member is rotated into the "extended" position, that is the tongues are positioned on the side opposite to the seatings 38 with respect to the axis b, in such a way as to be able to pass through the opening 40. Once the end of the shaft is in position in the hole 36, the locking member is rotated so as to bring the tongues into the seatings 38. A tight or interference fit is foreseen between the container and the locking member, so that they maintain their mutual position against rotation without the intervention of external forces. The locking member, therefore, remains held inside the container element, without any projecting parts and without being able to slide out.

The device assembled in this way can easily be inserted into a hole F, previously made in a panel. Once it has been inserted, it is easy to rotate the locking member by means of a screw-driver, so as to extract the tongues, which grip into the wall of the hole and anchor or fasten the device. The fastening can be realized simply by the grip of the tongues into the material or, preferably, the material can be gripped between the tongues and the surface 19.

Figure 17:
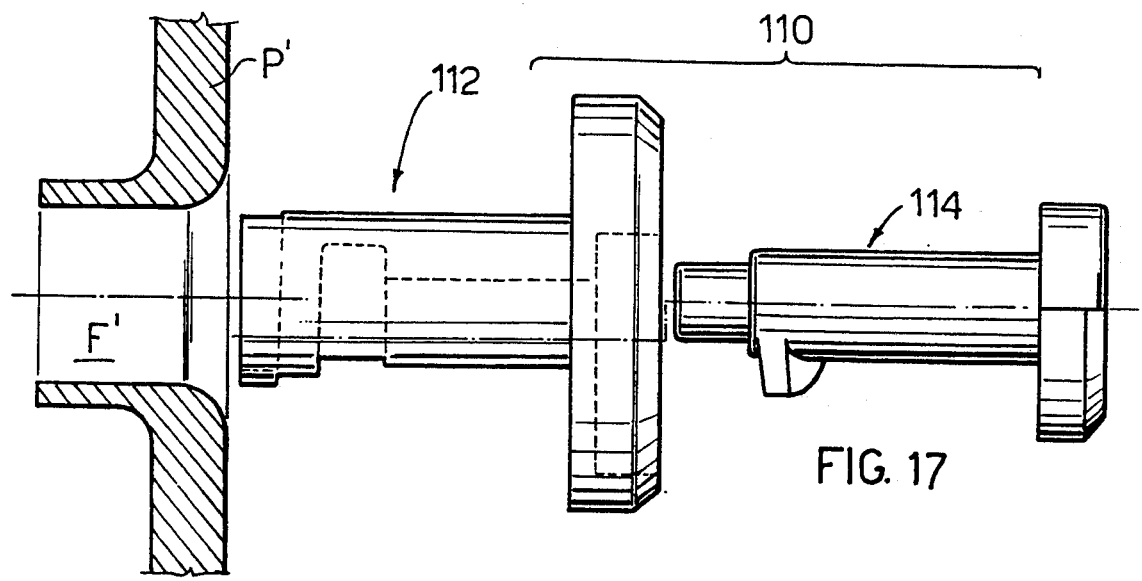
FIG. 17 is an exploded side view of the device in one of its embodiments with a single tongue.

It should be noted that the device can be used to assemble metallic sheets or panels. In such case, the device 110 (FIGS. 17 and 18) preferably comprises a container-guide 112 and a locking member 114 with a single tongue; the panel P', onto which the locking must be effected, has a hole F' with bent edges.

In the FIGS. 15 and 16, a further modified embodiment 210 of the device is illustrated. In this case, the container-guide element 212, cooperating with the locking member 214, is shaped in such a way that it forms a support for shelves, and comprises an arm 240 integral with the head 218, and a platform 242 integral with the arm. The surface 219 is formed on the arm.

The container-guide element can be realized in various other forms for other functions.

I claim:

1. A fastening device comprising:
   a container-guide element to be received into a hole in a panel;
   said container-guide element having an enlarged head, a body integral with said head and provided with a cavity having a longitudinal axis, a longitudinal opening connecting said longitudinal cavity with the outside, at least one intermediate seating communicating with said longitudinal cavity, and an end seating;
   a locking member having an enlarged head, a shaft integral with said head and defining a longitudinal axis, at least one tongue protruding from said shaft, oblique with respect to the longitudinal axis of the shaft and extending for an arc around said axis, said shaft having a coaxial end;
   said locking member being housed into the container-guide element with the shaft into the cavity and the end of the shaft into the end seating, said locking member being rotatable around its longitudinal axis between a rest position, wherein said at least one tongue is received into said at least one intermediate seating, and a locking position, wherein said at least one tongue is rotated outside of the container-guide element and is engaged with a wall of said hole.

2. A device according to claim 1, wherein the said at least one tongue extends along a helical surface around the longitudinal axis of the shaft of the locking member.

3. A device according to claim 1, wherein the said at least one tongue, in a section transverse to it, is tapered away from the longitudinal axis of the locking member.

4. A device according to claim 1, wherein the shaft of the locking member includes a plurality of tongues, and the head of the container-guide element has a surface opposed to said tongues.

5. A device according to claim 1, wherein the head of the container-guide element is provided with two abutment surfaces, and the head of the shaft is provided with abutment surfaces; said abutment surfaces of the container-guide element and of the locking member circumferentially facing each other and able to cooperate in order to define both the said rest position, wherein said at least one tongue is retracted inside the container-guide element, and the said locking position, wherein said at least one tongue projects from the container-guide element.

6. A device according to claim 1, wherein the head of the container-guide element has a through hole through which the shaft can pass with the said at least one tongue rotated into an extended position.

7. A device according to claim 1, wherein the head of the container-guide element is integral with an arm, and said arm is integral with a platform.

8. A device according to claim 1, wherein the container-guide element and the locking member are connected to each other with a tight fit, in such a way that they can have a mutual rotation only when an external force is applied to one of them.

* * * * *